United States Patent [19]

Ohtsuka et al.

[11] Patent Number: 5,962,600
[45] Date of Patent: Oct. 5, 1999

[54] THERMOPLASTIC COMPOSITION WITH A GRANULAR SURFACE APPEARANCE LIKE MARBLE

[75] Inventors: Yoshio Ohtsuka, Ichikai-Machi; Katsumi Oishi, Shimodate, both of Japan

[73] Assignee: General Electric Company, Schenectady, N.Y.

[21] Appl. No.: 09/244,663

[22] Filed: Feb. 4, 1999

Related U.S. Application Data

[62] Division of application No. 08/861,556, May 22, 1997, Pat. No. 5,905,122, which is a division of application No. 08/594,045, Jan. 30, 1996, Pat. No. 5,672,663, which is a division of application No. 08/224,935, Apr. 8, 1994, Pat. No. 5,489,656.

[30] Foreign Application Priority Data

Apr. 20, 1993 [JP] Japan .................................. 5-116536

[51] Int. Cl.$^6$ ...................................................... C08L 67/02
[52] U.S. Cl. ......................... 525/442; 525/438; 525/463; 525/465
[58] Field of Search ............................................. 525/442

[56] References Cited

U.S. PATENT DOCUMENTS 3,186,962  6/1965  Ranson .
5,100,974  3/1992  Kambour .
5,304,592  4/1994  Ghahary .

FOREIGN PATENT DOCUMENTS 0 449 135A1  2/1991  European Pat. Off. .
89/01504     2/1989  WIPO .

OTHER PUBLICATIONS

WPI AN–74–85228V.
WPI–AN–92–214205.

*Primary Examiner*—Patricia A. Short

[57] ABSTRACT

The objective of the invention is to produce a thermoplastic resin capable of producing a casting with a superior granular surface appearance like marble while maintaining the impact strength and other properties of the base resin. The present invention pertains to a thermoplastic composition with a granular surface appearance like marble produced by mixing and dispersing 0.001–10 parts by weight of thermosetting resin with 100 parts by weight of thermoplastic resin.

4 Claims, No Drawings

THERMOPLASTIC COMPOSITION WITH A GRANULAR SURFACE APPEARANCE LIKE MARBLE

This is a divisional of application Ser. No. 08/861,556 filed May 22, 1997, now isssued U.S. Pat. No. 5,905,122, which is a divisional of application Ser. No. 08/594,045 filed Jan. 30, 1996, now issued U.S. Pat. No. 5,672,663, which is a divisional of Ser. No. 08/224,935 filed on Apr. 08, 1994, now issued U.S. Pat. No. 5,489,656.

FIELD OF APPLICATION

The present invention pertains to a thermoplastic composition with a granular surface appearance like marble that can be used for an interior or exterior decorating material.
Conventional technology Polycarbonate resins, which are typical thermoplastic resins, are widely used as high performance resins with high impact resistance, high heat resistance, and excellent environmental resistance (engineering plastics). Also, crystalline resins such as polyethylene terephthalate and polybutylene terephthalate are engineering plastics with superior heat resistance and electrical properties and are widely used.

In the past, a technology capable of producing a casting with a granular surface appearance like marble by adding glass powder, rayon resin, and other inorganic materials to plastics commonly referred to as general-purpose resins, and dispersing in the base resin has been disclosed.

In the resins with a granular surface appearance like marble produced by conventional technology, for example, when a polycarbonate resin is used as the base resin, the excellent properties of the polycarbonate resin such as impact strength, environmental resistance and other physical and mechanical properties cannot be expected, and because of its lack of heat resistance, it is not possible to produce a casting with a good surface appearance.
Problems to be solved by the invention The objective of the present invention is to eliminate the conventional problems described above and to produce a thermoplastic composition with a granular surface appearance like marble by a simple method.
Means to solve the problem The objective described above can be achieved with a thermoplastic composition when a granular surface appearance like marble is produced by mixing and dispersing 0.001–10 parts by weight of a thermosetting resin with 100 parts by weight of a thermoplastic resin. For said thermosetting resin, thermosetting epoxy resins, thermosetting phenolic resins, etc., can be mentioned.

For the thermosetting resins used as the base resin in the structure described above, for polycarbonate resins, those produced by the polymerization method are widely used, as well as aromatic polycarbonate resins produced by the hot-melt method (for example, see Japanese Kokai Patent Application No. Sho 63[1988]-215763, and Japanese Kokai Patent Application No. Hei 2[1990]-124934 for reference). The polycarbonate resins described above consist of a carbonate component and a phenolic component.

For the precursor materials that induce the carbonate component, for example, phosgene, diphenyl carbonate, etc., can be mentioned. Also, for suitable diphenols, for example, 2,2-bis(4-hydroxyphenyl)propane, bisphenol A, 2,2-bis(3,5-dibromo-4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,4-bis(4-hydroxyphenyl)propane, 1,1-hydroxyphenyl)cyclododecane [sic; possibly, 1,1-bis(4-hydroxyphenylcyclododcene], 1,1-bis(3,5-dimethyl-4-hydroxyphenyl)cyclododecane, 4,4-dihydroxydiphenyl ether, 4,4-thiodiphenol, 4,4-dihydroxy-3,3-dichlorodiphenyl ether, and 4,4-dihydroxy-2,5-dihydroxyphenyl ether, etc., can be mentioned.

These components can be used separately or in combination. Also, in addition to those described above, compounds containing three or more phenolic hydroxy groups can be used. Furthermore, instead of or in addition to said polycarbonate resins, polyester resins such as polybutylene terephthalate can be used. In addition, appropriate components suitable for each application can be added.

The thermosetting epoxy resin or thermosetting phenolic resin dispersed in the thermoplastic resin provides the granular surface appearance like marble to the thermoplastic resin. Compared with conventional materials that are added for the same purpose, the grains of the powdered materials described above have a good solubility in the composition that comprises the base, and they have excellent heat resistance.

For the thermosetting epoxy resin, it is desirable to use a product produced by mixing an appropriate amount of ortho-cresol novolac epoxy, phenol formaldehyde and sintered kaolin, kneading under heat to produce crosslinking, then pulverizing, and screening. Also, additives such as release agents and colorants can be used in some cases in manufacturing the resin described above.

The average grain diameter of the thermosetting epoxy resin and thermosetting phenolic resin is in the range of 0.01–10 mm, preferably 0.1–2 mm. The surface appearance is essentially lost when less than 0.01, and uniform dispersion cannot be achieved when greater than 10 mm; therefore, not only is it difficult to use in manufacturing but also it is not possible to maintain the uniformity of the product.

Also, a mixing ratio of 0.001–10 parts by weight for 100 parts by weight of the base thermoplastic resin is desirable. When less than 0.001 parts by weight, the granular surface appearance like marble of the product is less likely to be achieved, and when greater than 10 parts by weight, the surface appearance of the product is lost, and the base properties of the thermoplastic resin are lost in some cases, and the initial objective cannot be achieved.

In manufacturing the thermoplastic composition of the present invention, which has a granular surface appearance like marble, the base thermoplastic resin, a thermosetting epoxy resin and a thermosetting phenolic resin that meet the conditions described above are mixed, hot-melt kneaded in an appropriate extruder and extruded to form a pellet. Also, in addition to the components described above, appropriate additives, for example, environmental resistance modifiers, ultraviolet inhibitors, stabilizers, antioxidants, release agents, crystal-nucleating agents, plasticizers, fluid modifiers, antistatic agents, flame retardants, colorants, etc., can be included as needed.
Effect The thermosetting epoxy resin and thermosetting phenolic resin used for the thermoplastic composition of the present invention which has a granular surface appearance like marble are nearly free from deformation or destruction at the time of manufacture of the thermoplastic resin, and a constant shape is maintained. Therefore, it is possible to produce a desired thermoplastic composition with a granular surface appearance like marble when the initial grain diameter of the thermosetting epoxy resin and thermosetting phenol resin is selected accordingly.

Also, a product with a natural granular surface appearance like marble can be produced due to the irregularity of the grain produced when the thermosetting epoxy resin and the thermosetting phenolic resin are pulverized.

APPLICATION EXAMPLES

In the following, the content of the present invention is disclosed with application examples. The polycarbonate resin used as a transparent base in the present invention is a transparent and chemically and physically stable resin, and is commonly known as an engineering plastic.

Application Example 1

0.5 part by weight of thermosetting epoxy resin (produced by Japan Synthetic Chemicals, Ltd., Acmelite [transliteration] 200: product name) with an average grain diameter of 1.0 mm, and 0.3 part by weight of rutile titanium oxide (produced by Tioxide Japan, Ltd., RTC-30: product name) were added to 100 parts by weight of polycarbonate resin (produced by Japan GE Plastics, Ltd., IV [intrinsic viscosity]=0.5 dL/g), mixed in a Henschel mixer and formed into a pellet as the mixture was kneaded and melted under heat in a 50-mm monoaxial extruder.

A sample piece was produced from the pellet described above by a 100-t injection molder, and physical properties were measured, and the surface appearance was compared. The molding conditions were 280° C. and cycles of 30 sec. residence molding conditions were 310° C. and cycles of 600 sec. The values of properties and the results of the evaluations are shown as Application Example 1 in Table I.

Also, the Izod impact strength was measured for a bar-shaped sample casting with dimensions of 63.5×12.7×3.2 mm at room temperature according to the Izod impact test with the notch defined in ASTM D256.

The TS (tensile strength) was measured with a dumbbell type sample casting with a length of 175 mm and thickness of 3.18 mm according to the method defined in ASTM D-638. The MI (melt index) was measured by test method A defined in JIS K7210. The test conditions were a temperature of 300° C. and a weight of 1.2 kg. The residence MI was measured by the conditions described above. Also, the residence color difference was measured by the CA-35 spectrophotometer of Murakami Color Research Center based on the 1976 CIE Lab Color Table System with the color of the sample casting produced under normal conditions as a reference.

TABLE I

Comparison of Application Examples and Comparative Examples.

| | Application Example | Application Example | Application Example | Comparative Example |
|---|---|---|---|---|
| Polycarbonate Resin | 100 | 100 | 100 | 100 |
| Thermosetting Epoxy Resin | 0.5 | 2.0 | | |
| Thermosetting PhenolResin | | | 0.5 | |
| Seilicate Compound | | | | 0.5 |
| Rutile Titanium Oxide | 0.3 | 1.0 | 0.3 | 0.3 |
| IZOD (Impact Strength) kg/cm² | 80 | 80 | 80 | 10 |
| TS (Tensile Strength) kg/cm² | 620 | 600 | 580 | 250 |
| MI (Flow Property) g/10 min | 10 | 10 | 10 | 20 |
| Residence Flow Property g/10 min | 12 | 13 | 13 | 60 |
| Residence Color Difference ΔE* | 0.4 | 0.4 | 0.6 | 2.0 |

Note: The amount of each component in the table is in parts by weight.

Key:
1. Application Example
2. Comparative Example
3. Polycarbonate resin
4. Thermosetting epoxy resin
5. Thermosetting phenol resin
6. Silicate compound
7. Rutile titanium oxide
8. IZOD (impact strength)
9. TS (tensile strength)
10. MI (flow property)
11. Residence flow property
12. Residence color difference

Application Example 2

The [amount of] thermosetting epoxy resin in Application Example 1 was changed to 2.0 parts by weight, and the [amount of] rutile titanium oxide was changed to 1.0 part by weight. A sample piece similar to the one produced in Application Example 1 was produced from the resulting composition, and the same tests were done. The results are as shown in Table I.

Application Example 3

Instead of the thermosetting epoxy resin in Application Example 1, 0.5 part by weight of thermosetting phenolic resin were used, and 0.3 part by weight of rutile titanium oxide were added. A sample piece similar to those produced in Application Example 1 and Application Example 2 was produced from the resulting composition, and the same tests were done. The results are as shown in Table I.

Comparative Example

Instead of the thermosetting epoxy resin or thermosetting phenolic resin in said application examples, 0.5 part by weight of silicate compound, which has been used in conventional general resins for the same purpose, was used, and 0.3 part by weight of rutile titanium oxide was added. A sample piece similar to the one produced in the application examples was produced from the resulting composition and the same tests were done. The results are as shown in Table I as the comparative example.

As shown in the table above, an excellent surface appearance is achieved in Application Examples 1, 2, and 3, while the excellent properties of the polycarbonate resin are retained. Even when different amounts are used in the application examples, the properties are superior in all cases.

Effect of the Invention

The thermoplastic composition of the present invention which has a granular surface appearance like marble has an excellent surface appearance while maintaining the properties of the thermoplastic base resin. Therefore, the product can be used effectively for various interior and exterior decorations that required mechanical strength as well as a granular surface appearance like marble, for example, the top of a table, or as a surface material for furniture, sinks, kitchen counters, the exterior of home appliances, building materials and surface structures, decorations for gardens and city walks, etc. In addition, the environmental resistance, chemical resistance, and flame retardancy are superior, since the base properties of the thermoplastic resin are retained; therefore, wide applications in various fields are expected.

We claim:

1. A composition produced by mixing and dispersing 0.001–10 parts by weight of a cross-linked thermosetting phenolic resin with an average grain diameter of 0.01 to 10 mm with 100 parts by weight of a polyester resin whereby the composition has a granular surface appearance like marble and maintains the properties of the polyester resin.

2. The composition of claim 1, which additionally contains a thermosetting epoxy resin.

3. The composition of claim 2 which additionally contains an additive selected from the group consisting of environmental resistance modifiers, ultraviolet inhibitors, stabilizers, antioxidants, release agents, crystal-nucleating agents, plasticizers, fluid modifiers, anti static agents, flame retardants and colorants.

4. An injection molded article having a granular marble-like surface appearance molded from a composition produced by mixing and dispersing 0.001–10 parts by weight of a cross-linked thermosetting phenolic resin with an average grain diameter of 0.01 to 10 mm with 100 parts by weight of a polyester resin whereby the composition has a granular surface appearance like marble and maintains the properties of the polyester.

* * * * *